United States Patent [19]
Ostwald

[11] 3,877,716
[45] Apr. 15, 1975

[54] WHEEL SUSPENSION FOR THE STEERED WHEELS OF VEHICLES INCLUDING A DISC BRAKE

[75] Inventor: Fritz Ostwald, Buchschlag, Germany

[73] Assignee: ITT Industries, Inc., New York, N.Y.

[22] Filed: July 5, 1973

[21] Appl. No.: 376,483

[30] Foreign Application Priority Data
July 7, 1972 Germany............................ 2233391

[52] U.S. Cl............................... 280/96.3; 188/18 A
[51] Int. Cl............................................... B62d 7/08
[58] Field of Search......... 280/96.2 R, 96.2 A, 96.1, 280/96.3; 188/18 A; 180/43, 44, 45, 46, 47, 48

[56] References Cited
UNITED STATES PATENTS
| | | | |
|---|---|---|---|
| 2,297,901 | 10/1942 | Leighton...................... | 280/96.2 R X |
| 2,299,935 | 10/1942 | Slack et al. .................... | 280/96.2 X |
| 2,523,598 | 9/1950 | Smith............................ | 280/96.3 X |
| 3,492,018 | 1/1970 | Burckhardt et al................ | 280/96.2 |

FOREIGN PATENTS OR APPLICATIONS
| | | | |
|---|---|---|---|
| 324,650 | 4/1903 | France............................... | 280/96.3 |
| 9,751 | 4/1909 | United Kingdom.................. | 180/48 |
| 1,430,266 | 11/1968 | Germany........................... | 280/96.2 |

Primary Examiner—Robert B. Reeves
Assistant Examiner—Charles A. Marmor
Attorney, Agent, or Firm—John T. O'Halloran; Menotti J. Lombardi, Jr.; Alfred C. Hill

[57] ABSTRACT

The wheel suspension arrangement is mounted on and guided by transversal swinging arms with the disc brake being positioned between the chassis frame and the wheel swivel axis, preferably with the swivel axis being disposed at right angles to the roadway in the driving direction. A steering knuckle is aligned along the swivel axis. A connection is established between the transversal swinging arms and the steering knuckle by means of bifurcated bridging elements which overlap the edge of the brake disc and rest on pivot bearings in the steering knuckle such that these pivot bearings receive the flexural torque of the bridging elements rather than the disc brake.

8 Claims, 1 Drawing Figure

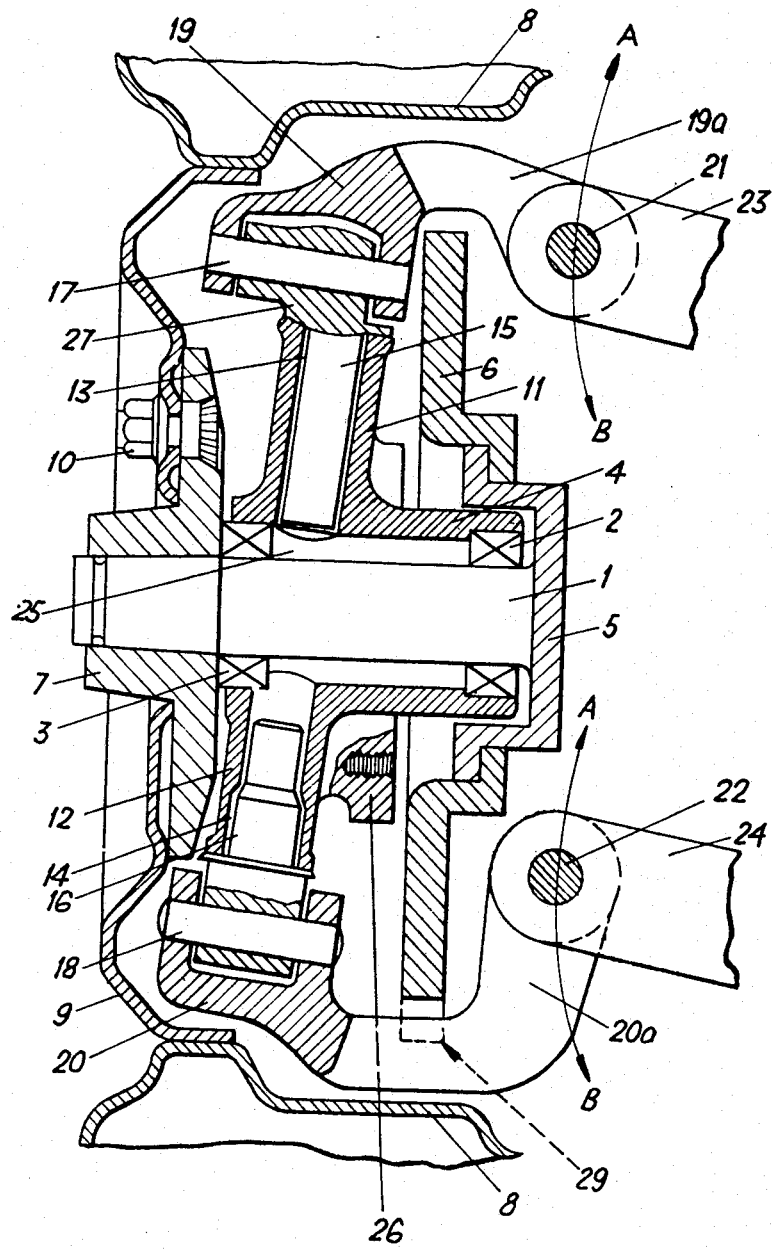

WHEEL SUSPENSION FOR THE STEERED WHEELS OF VEHICLES INCLUDING A DISC BRAKE

BACKGROUND OF THE INVENTION

This invention relates to a wheel suspension for the steered wheels of a vehicle which are mounted on, and guided by, transversal swinging arms or shock-absorber struts, with a friction brake being positioned between the chassis frame and the wheel swivel axis, and more particularly for such wheels where the swivel axes cut the roadway at right angles to the driving direction outside of the vehicle base.

It is known from German Printed Patent Specification DT-PS 1,077,538 that in such wheel suspensions the mounting of brakes of the conventional type is accompanied with special difficulties. In particular, in modern motor vehicles the rim diameter is, as a rule, kept relatively small, while, on the other hand, the high speeds which can be reached with these vehicles demand a strong and consequently space-consuming design of the wheel-suspension members.

Therefore, it has been suggested to transfer the brake disc of the wheel brake to that end of the wheel axle facing the vehicle, i.e., to the space between the chassis frame and the swivel axis, so that the brake disc is placed completely outside the range of the wheel rim and is directly exposed to the cooling air stream.

Such an arrangement (see VDI-Nachrichten No. 21 of May 22, 1968) has the considerable disadvantage that the diameter of the brake disc has to remain limited, since those members of the wheel suspension which are connected with the steering knuckle and are subject to to-and-fro motion during driving, especially the transversal swinging arms, limit the space, and, in particular, the diameter of the space required for installing a brake.

SUMMARY OF THE INVENTION

It is an object of the present invention to provide a wheel suspension of the type described above wherein a brake is installed between the chassis frame and the swivel axis, the brake-disc diameter thereof being larger than generally customary.

Another object of the present invention is to provide the above mentioned improved wheel suspension employing members available for the conventional wheel suspension, such as, in particular, the transversal swinging arms or the shock-absorber strut.

Still another object of the present invention is to provide the above mentioned improved wheel suspension and yet be light-weight and capable of inexpensive manufacture.

According to this invention the above objects are achieved by providing a connection between the movable members of the wheel suspension adjacent the frame and the dirigible steering knuckle in the form of bridging elements overlapping the edge of the brake disc, with these bridging elements resting on pivot bearings in the steering knuckle, the pivot bearings receiving the occurring flexural torque of the bridging elements. The bridging elements are, according to one form of this invention, constructed as one piece, i.e., the bridging element is formed integrally with the steering pin. In order to avoid deflections of the steering pins in their bearings in the steering knuckle due to wheel suspension distortion under strong braking torques, a preferred embodiment provides a balance pin between the bridging element and the steering pin which is positioned essentially parallel to the wheel axle and at right angles to the steering pin.

A feature of the present invention is the provision of the bridging elements having their ends adjacent the vehicle designed as cylindrical bearings with fist- or fork-like ends and their ends adjacent the wheel rim designed as a forked joint providing the connection with the steering pins.

Another feature of the present invention is the provision of bifurcated bridging elements having arms connected via joints with the members of the wheel suspension.

Still another feature of the present invention is to provide the bridging elements with a sufficient amount of rigidity by shaping each of the bridging elements to have the shape of ball-shell sections or a U-shaped configuration which are placed between the outer peripheral surface of the brake disc and the inner peripheral surface of the wheel rim.

BRIEF DESCRIPTION OF THE DRAWING

The above-mentioned and other objects and features of this invention and the manner of obtaining them will become more apparent by reference to the following description taken in conjunction with the drawing, the sole FIGURE of which is a partial cross-sectional view of a wheel suspension in accordance with the principles of the present invention.

DESCRIPTION OF THE PREFERRED EMBODIMENT

In a known way, the wheel axle 1 is swivel-mounted in the steering knuckle 4 with the aid of roller bearings 2 and 3. Axle 1 has secured on the end thereof facing the vehicle the brake disc 6 via a flange 5. Axle 1 also has secured to the end thereof facing the wheel the hub flange 7. The rim 8 has welded thereto the rim dish 9 which is screwed to hub flange 7 with the aid of wheel bolts 10. Seen in a vertical direction, steering knuckle 4 includes arms 11 and 12 which possess bore holes 13 and 14, respectively, to receive the steering pins 15 and 16, respectively. Steering pins 15 and 16 disposed in bore holes 13 and 14 are connected with the bridging elements 19 and 20, respectively, by means of balance pins 17 and 18, respectively. For instance, as illustrated this latter connection is in the form of a fork joint connecting the members 19 and 15 which permits distortions without transmitting swivel moments to the steering pins 15 and 16. The bridging elements 19 and 20, in turn, are connected with the conventionally designed transversal swinging arms 23 and 24 via the joints 21 and 22.

In the wheel suspension embodiment shown in the FIGURE, the swivel axis 25 passing through steering pins 15 and 16 has been arranged to cut the roadway at right angles to the driving direction (not shown) outside of the vehicle base. Furthermore, steering knuckle 4 is provided with a brake carrier 26 essentially extending in a horizontal direction for fastening the brake caliper which is not shown and described in detail herein.

The two pairs of transversal swinging arms 23 and 24 are swivel-mounted on the vehicle frame by their other ends (not shown in the drawing) and are supported by the vehicle body via a spring (not illustrated either). During wheel jouncing, transversal swinging arms 23 and 24 simultaneously swing in the direction of arrow A, i.e., upwards, while during wheel rebounding, they swing in the direction of arrow B. In this process, the distance of the joints 21 and 22 move on circular paths and always remain constant. Since bridging elements 19 and 20 bifurcate within the region of the outer edge or periphery of brake disc 6 (each bridging element is provided with two arms 19a and 20a, respectively) and since, in addition, the right angle between balance pins 17 and 18 and swivel axis 25 as well as the position of the bridging elements 19 and 20 relative to the brake disc 6 or to the steering pins 15 and 16, respectively, are invariable, it is possible to employ brake disc 6 having a larger diameter (see the broken line 29).

When turning the wheel during cornering, the steering knuckle 4 will be rotated round the swivel axis 25 by tie rods (not shown) with the aid of a swinging arm acting upon said steering knuckle. During this process, brake disc 6 will move out of, or into, the illustrated plane while bridging elements 19 and 20 and transversal swinging arms 23 and 24, respectively, remain in their illustrated positions.

In order to limit the load of steering pins 15 and 16 during braking, bridging elements 19 and 20 and steering pins 15 and 16 have been designed in such a way as to form two separate members which are connected with each other via balance pins 17 and 18. These balance pins permit a slight swing motion of the members 15, 19 and 16, 20, respectively, towards each other.

It will be understood that a shock-absorber strut can be fixed to the bridging element 19 instead of the upper transversal swinging arm 23. In this case, balance pin 17 is not necessary and bridging element 19 is integrally formed with the head 27 of steering pin 15.

While I have described above the principles of my invention in connection with specific apparatus it is to be clearly understood that this description is made only by way of example and not as a limitation to the scope of my invention as set forth in the objects thereof and in the accompanying claims.

I claim:

1. A wheel suspension for steered wheels of a vehicle comprising:
   an axle for each of said steered wheels;
   a steering knuckle cooperatively associated with said axle of each of said steered wheels to enable said steered wheels to be steered, each of said steering knuckles having a swivel axis that intersects the roadway at right angles to the driving direction outside a frame of said vehicle;
   a brake disc connected to said axle of each of said steered wheels at a location between said frame of said vehicle and said swivel axis;
   a pair of transversal swinging arms for each of said steered wheels adjacent said frame of said vehicle, said swinging arms assisting in steering said steered wheels;
   a pair of pivot bearings disposed in each of said steering knuckles coaxial of said swivel axis; and
   a pair of bridging elements for each of said steered wheels, each of said pair of bridging elements being connected between an associated one of said swinging arms and an associated one of said pivot bearings of an associated one of said steered wheels, each of said pair of said bridging elements having a section with a U-shaped configuration adjacent said brake disc to overlap the outer peripheral surface of said brake disc with one leg of said U-shaped configuration being connected to said associated one of said pivot bearings and the other leg of said U-shaped configuration being connected to said associated one of said swinging arms, said pivot bearings receiving flexural torque of an associated one of said bridging elements.

2. A wheel suspension according to claim 1, wherein each of said pivot bearings includes
   a steering pin coaxial of said swivel axis; and further including
   a balance pin for each of said pivot bearings, each of said balance pins interconnecting one of said steering pins with an associated one of said bridging elements, each of said balance pins being disposed substantially parallel to said axle and at right angles to an associated one of said steering pins.

3. A wheel suspension according to claim 2, further including
   a pair of cylindrical bearings each connected between a different one of said bridging elements and an associated one of said swinging arms; and
   a pair of forked joints each formed in a different one of said bridging elements adjacent an associated one of said steering pins for connection to said associated one of said steering pins by an associated one of said balance pins.

4. A wheel suspension according to claim 1, wherein each of said bridging elements include
   bifurcated arms connected to an associated one of said swinging arms by a cylindrical bearing.

5. A wheel suspension according to claim 1, wherein each of said sections are disposed between the outer peripheral surface of said brake disc and the inner peripheral surface of a rim of an associated one of said steered wheels.

6. A wheel suspension according to claim 1, further including a brake carrier carried by said steering knuckle.

7. A wheel suspension according to claim 1, wherein each of said bridging elements includes
   a recess to enable said bridging elements to overlap the outer peripheral surface of said brake disc an additional amount.

8. A wheel suspension according to claim 7, wherein each of said sections includes a pair of spaced arms to form said recess.

* * * * *